United States Patent
Mahalawat et al.

(10) Patent No.: US 7,356,047 B1
(45) Date of Patent: Apr. 8, 2008

(54) 10/100/1000/2500 MBPS SERIAL MEDIA INDEPENDENT INTERFACE (SGMII)

(75) Inventors: Sanjeev Mahalawat, Cupertino, CA (US); John McCool, Los Gatos, CA (US); Christophe Metivier, Los Altos, CA (US); Sun-Den Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 836 days.

(21) Appl. No.: 10/831,510

(22) Filed: Apr. 24, 2004

(51) Int. Cl.
*H04J 3/22* (2006.01)
(52) U.S. Cl. .................. 370/469; 370/401; 370/395.5
(58) Field of Classification Search ............. 370/229, 370/235, 400, 401, 468, 469, 395.5
See application file for complete search history.

(56) References Cited

U.S. PATENT DOCUMENTS

| 7,149,397 | B2 * | 12/2006 | Popovic et al. ............. 385/134 |
| 2003/0179710 | A1 * | 9/2003 | Huff ........................... 370/248 |
| 2004/0246953 | A1 * | 12/2004 | Muth et al. ................. 370/366 |

OTHER PUBLICATIONS

Cisco Systems, Inc., "Serial-GMII Specification", Document No. ENG-46158, Jul. 19, 2001, 10 pages, retrieved from the Internet: <URL:ftp://ftp-eng.cisco.com/smii/sgmii.pdf>.

* cited by examiner

*Primary Examiner*—Chi Pham
*Assistant Examiner*—Phuc Tran
(74) *Attorney, Agent, or Firm*—Charles E. Krueger (57) ABSTRACT

A SGMII that operates to transfer data between MAC and PHY chips at 2500/1000/100/10 Mbps utilizes a unique frame extending technique in one embodiment where frames having multiples of 2 and 3 data bytes are utilized to change the data transfer rate by multiples of 2.5. In another embodiment different clock signals are utilized.

8 Claims, 5 Drawing Sheets

10/100/1000/2500 Mbps SGMII architectural view

FIG. 1

2.5 Gbps Ethernet SGMII byte repeating for 2.5 Gbps Port 2.5 Gbps Ethernet SGMII byte repeating for 1 Gbps Port 2.5 Gbps Ethernet SGMII byte repeating for 100 Mbps Port 2.5 Gbps Ethernet SGMII byte repeating for 10 Mbps Port 10/100/1000/2500 Mbps SGMII Segment Repeating Scheme

10/100/1000/2500 MBPS SERIAL MEDIA INDEPENDENT INTERFACE (SGMII)

BACKGROUND OF THE INVENTION

Due to its simple and scalable data rates Ethernet is one of the most successful layer 1 protocols and Ethernet has become a layer 1 protocol of choice. The current data rates specified by IEEE 802.3 are 10 Mbps, 100 Mbps, 1000 Mbps, which is known as 1 Gbps Ethernet (GE), and 10,000 Mbps, which is known as 10 Gbps Ethernet (10 GE). Due to its simplicity and technical feasibility 10 Mbps, 100 Mbps and 1 Gbps data rates were able to utilize the existing equipment, component, and wiring infrastructure, as the data rates progressed, at no significant additional cost.

However, the landscape changed with the introduction of 10 GE. Although, the simplicity of continuing to increase data rates by a factor of 10 made sense based on the past history of Ethernet, it turns out that going to 10 Gbps is very expensive because, due to its very high speed, technical and physical constraints, it is not compatible with the existing infrastructure. This high speed has thus increased the cost and size of components and wiring.

Accordingly, an alternative to 10 GE that is cost effective yet still provides increased data transfer capability is required in the networking field.

BRIEF SUMMARY OF THE INVENTION

In a first embodiment of the invention, a rate adaptation unit adjusts the data transfer rates by extending frames using first and second segments repeating successive frames bytes by multiples of 1, 2, 20, 200 and 1, 3, 30, 300 for 2500 Mbps, 1000 Mbps, 100 Mbps, and, 10 Mbps respectively. When the extended bytes are received only one frame byte from each segment is sampled.

In a second embodiment of the invention, a first clock signal is utilized for data transfers of 1000/100/10 Mbps and a second clock signal is utilized for data transfers of 2500 Mbps.

Other features and advantages of the invention will be apparent from the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The layered model of Ethernet includes a Media Access Control (MAC) layer and a physical layer device (PHY) layer. The MAC layer is responsible for, among other things, controlling access to the media and PHY layer is responsible for transmitting bits of information across a link. In Ethernet the interface between the MAC and the PHY is specified by IEEE 802.3 and has evolved from the 10 pin MII (Media Independent Interface) for 10/100 Ethernet, to the 20 pin GMII (Gigabit Media Independent Interface) for GE, to the 36 pin XGMII (10 Gigabit Media Independent Interface) for 10 GE.

In the case of GMII, for multiple port chips the high pin count became an obstacle because each port requires its own GMII. The assignee of the present application developed the SGMII (Serial Gigabit Media Independent Interface) to reduce the pin count to 6 pins per interface.

As is known in the art, SGMII uses two data signals and two clock signals to convey frame data and link rate information between a 10/100/1000 PHY and an Ethernet MAC. The data signals operate at 1.25 Gbaud and the clocks operate at 625 MHz (a double data rate (DDR) interface). It is also possible to use only two differential data signals (one in each direction) and the receivers are required to extract the clocks from the data. A 1.25 Gbaud data transfer rate is required because of the 25% overhead required for serial encoding of the data.

The PHY determines the maximum speed of data transfer, either 1000, 100, or 10 Mbps, by performing auto-negotiation with the device at the other end of the link. The PHY then communicates with the MAC utilizing SGMII and performs the data transfer at the auto-negotiated rate.

Control information signaling data speed is transferred between control registers in the MAC and the PHY. Specifically, bits [11:10] of a 16-bit control register indicate whether the data transfer rate is 1000 Mbps, 100 Mbps, or 10 Mbps.

Clearly, SGMII's 1.25 Gbaud transfer rate is excessive for interfaces operating at 10 or 100 Mbps. When these situations occur, the interface "elongates" the frame by replicating each frame byte 10 times for 100 Mbps and 100 types for 10 Mbps. This frame elongation takes place "above" the 802.3z PCS layer, thus the start frame delimiter only appears once per frame. The 802.3z PCS layer may remove the first byte of the "elongated" frame.

As described above, the 10 Gbps Ethernet does not operate utilizing the standard existing infrastructure, e.g., Cat 5 copper cabling, that is installed in most offices today. Additionally, SGMII does not scale to 10 Gbps so that the interface between the MAC and PHY layers is either XGMII for parallel interfaces or XAUI (10 Gigabit Attachment Unit Interface). The XAUI is an interface that utilizes four serial differential lanes clocked at 3.125 Gbps.

A technique that allows Ethernet switching and routing equipment that extends 1 Gbps at no significant additional cost at the 1 Gbps port density that uses existing components and wiring infrastructure will now be described.

The inventors have determined that a data rate of 2.5 Gbps can be supported by existing media and PHY layer devices and is the right choice to extend 1 GE as an alternative to 10 GE. It has been determined that 2.5GE extends to 100 m Cat5 cable, is compatible and functionally compliant with 1 GE therefore providing for simple implementation, uses the same 1 GE (1.25 Gbaud) modules as they extend to 2.5 Gbps (3.125 Gbaud) rates, and provides a good implementation choice for server Ethernet NIC, Ethernet Bridge and Router vendors. Additionally, 2.5 Gbps SERDES units for providing a serial link between the MAC and PHY have been developed for XAUI and are available as standard parts. Accordingly, embodiments of the invention will now be described that are in the form of an SGMII designed to operate at a data transfer rate of the 2.5 Gbps.

To support 2.5 Gbps Ethernet over fiber it is intended to use, without any modification, the 1 GE MAC, PCS and PMD with an increase of the data transmission rate to 2.5 Gbps and, after 8b10 encoding, serially transmitting the data over fiber at 3.125 Gbaud. This requires the MAC and PCS of 1 GE to run at 312.5 Mhz on parallel 10 bit interface or 3.125 Gbaud serial interface for reduced pin count highly integrated solutions. This is a simple multiplication factor of 2.5 (1 Gbps×2.5=2.5 Gbps and 125 Mhz×2.5=312.5 Mhz) for the operating frequency. The inventors' research has shown that all the 1 Gbps (1.25 Gbaud) Ethernet PMDs operating at 2.5 Gbps (3.125 Gbaud) could support the same 1 Gbps Ethernet specified type of fibers and lengths.

In order to support higher port density PHYs the low pin count interface SGMII is used in these embodiments. However, to support 2.5 Gbps Ethernet the existing SGMII specification needs to be modified.

Figure 1:
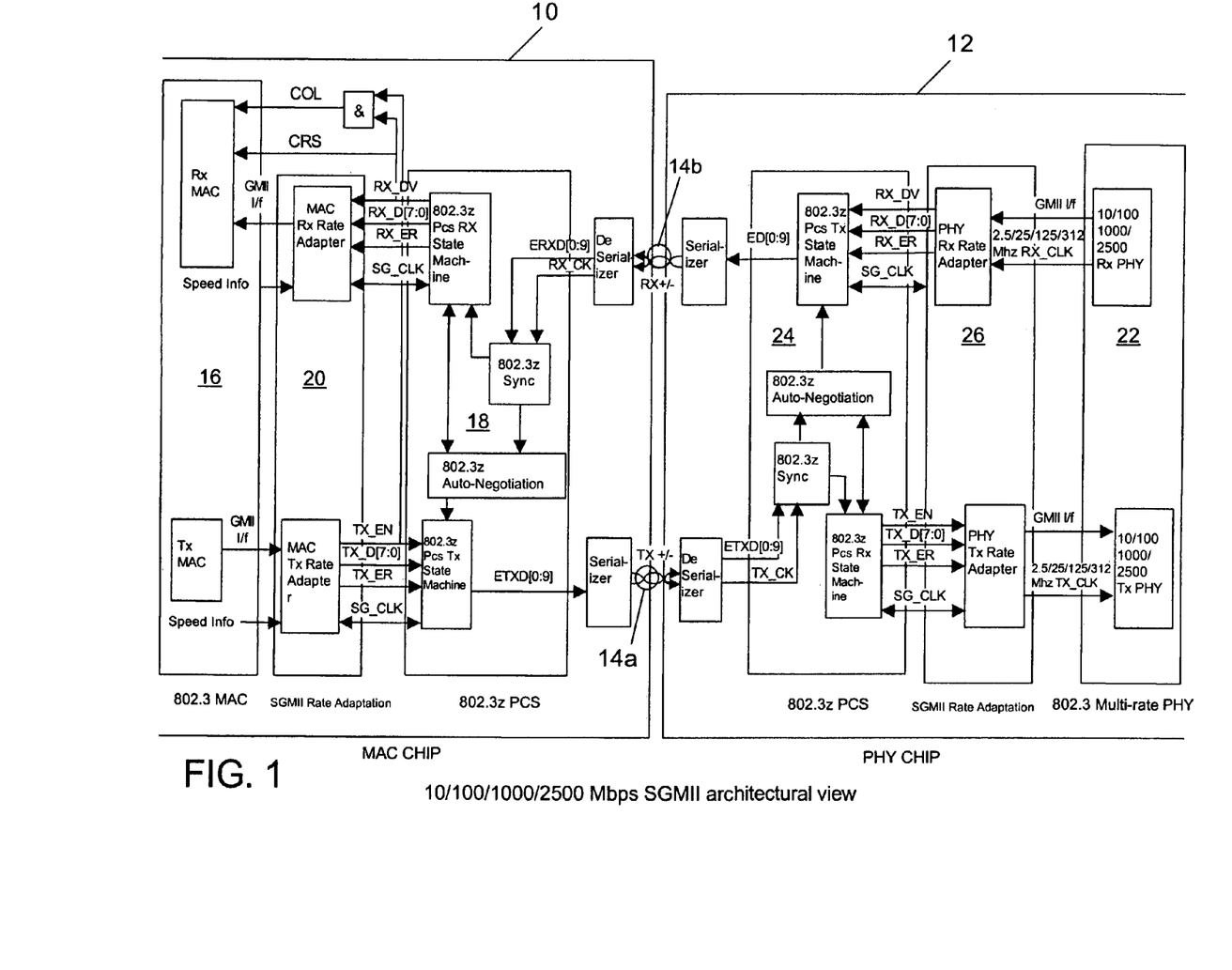
FIG. 1 is a block diagram of the architecture of an embodiment of the invention.

FIG. 1 is a block diagram of a 10/100/1000/2500 Mbps SGMII. In FIG. 1 a MAC chip 10 and PHY chip 12 are connected by Tx and Rx serial links 14a and b. The MAC chip 10 includes an 802.3 MAC module 16, and 802.3z PCS 18 module, and an SGMII Rate Adaptation Unit 20 coupling the 802.3 MAC module 16 and 802.3z PCS module 18. The PHY chip 12 includes an 802.3 Multi-Rate PHY module 22, and 802.3z PCS module 24, and an SGMII Rate Adaptation Unit 26 coupling the 802.3 Multi-Rate PHY module 22 and 802.3z PCS module 24.

The transmit and receive data paths leverage the 1000BASE-SX PCS defined in the IEEE 802.3z specification (clause 36). The traditional GMII data transmit/receive signals (TXD/RXD), data valid signals (TX_EN/RX_DV), and error signals (TX_ER/RX_ER) are encoded, serialized and output with the appropriate DDR clocking. Thus it is a 3.125 Gbaud interface with a 3.125 GHz clock. Carrier Sense (CRS) is derived/inferred from RX_DV, and collision (COL) is logically derived in the MAC when RX_DV and TX_EN are simultaneously asserted.

Link information is sent by the PHY chip to the MAC chip whenever PHY detects any changes in the link state. This transfer of information is initiated by PHY chip to MAC chip using 802.3z (Clause 37) Auto-Negotiation process. Whenever there is any change in the link state information the PHY chip instead of advertisement, sends the link state information via tx_config_reg[15:0]. The MAC chip, upon receipt of the link information acknowledges the update by asserting bit 14 of its tx_config_reg[15:0].

In this embodiment, the SGMII link_timer inside the Auto-Negotiation has been changed to 1.6 ms from 10 ms (standard) to ensure a prompt update of link state information between MAC and PHY chips.

Due to very high frequency of interface, 2.5 Gbps SGMII sends a clock embedded in encoded data but does not prevent using source-synchronous clocking.

The existing 10/100/1000 Mbps SGMII specifies the interface base bandwidth at 1.25 Gbaud which is the operating bandwidth of 1000 Mbps. To support 10 Mbps and 100 Mbps data rates, SGMII stretches the frame by replicating each frame byte 10 times for 100 Mbps and 100 times for 10 Mbps. This function happens in MAC/PHY transmit/receive SGMII Rate Adaptation logic which is above 802.3z PCS (Physical Coding Sublayer) and therefore, the rate adaptation is transparent to the PCS. The PCS performs the frame delimiting as usual and delimiting bytes appear once per frame. (Note that, for this embodiment, in transmit PCS replaces first byte of preamble 8'h55 by /SOP/ and in receive it replaces back the /SOP/ by 8'h55).

In order to provide 2.5 Gbps data rate over SGMII the existing SGMII needs to be modified because the data for slower 10/100/1000 Mbps networks the data cannot simply be extended by a factor of 10 for each step downward in speed.

In a first embodiment of the invention, the SGMII Rate Adaptation block of FIG. 1 utilizes differently sized frame extender blocks and a special data sampling mechanism to reduce the data rate by a factor of 2.5, 25, and 250 for networks having data transmission rates of 1000, 100, and 10 Mbps respectively. A detailed description of this mechanism follows with reference to FIGS. 2, 3, and 4.

In this embodiment, the run SGMII MAC is run at a 312.5 Mhz (3.125 Gbaud serial line) base frequency. Since 2.5 Gbps is 2.5 times the base 1 Gbps data transfer rate the bytes in segments can not be repeated 2.5 times, since 2.5 is not an integer multiplier. In order to solve this problem, this embodiment utilizes three types of byte repeating segments as depicted in FIG. 2.

Figure 2:
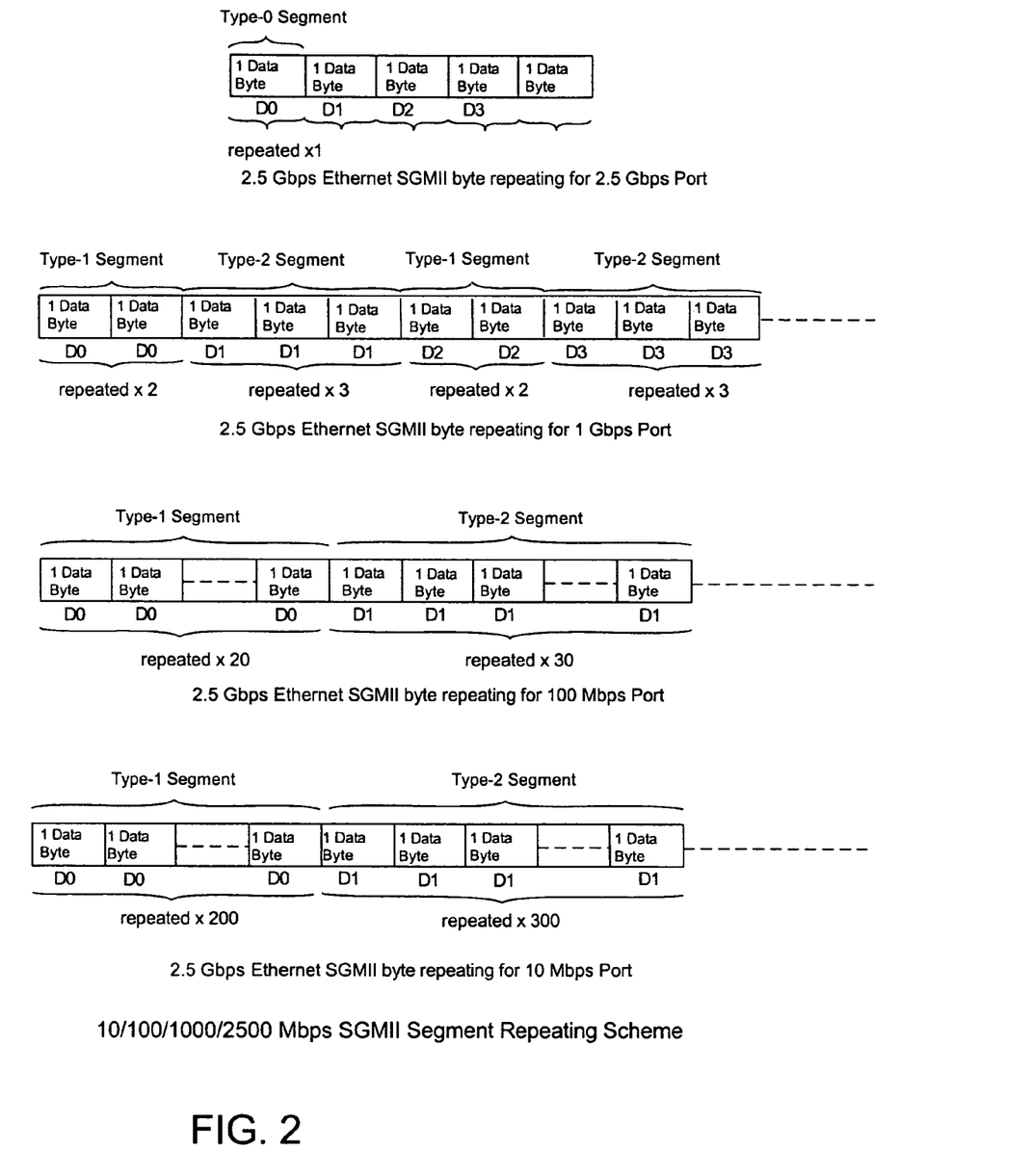
FIG. 2 is schematic diagram of a segment repeating scheme utilized in an embodiment of the invention.

The Type-0 byte repeating segment, depicted at the top of FIG. 2, only repeats each frame data byte once and is used only for 2.5 Gbps operation. A Type-I segment repeats a frame data byte 2 times for 1 Gbps data transfer, 20 times for 100 Mbps data transfer, and 200 times for 10 Mbps data transfer. A Type-2 segment repeats a frame data byte 3 times for 1 Gbps data transfer, 30 times for 100 Mbps data transfer, and 300 times for 10 Mbps data transfer. These two segments follow each other in alternate fashion as depicted in FIG. 2 for a 1000 Mbps port, a 100 Mbps port, and a 10 Mbps port. It may happen that one frame starts with Type-1 segment and next frame starts with Type-2 segment or vice-versa. FIG. 2 shows this segment repeating scheme.

Figure 4:
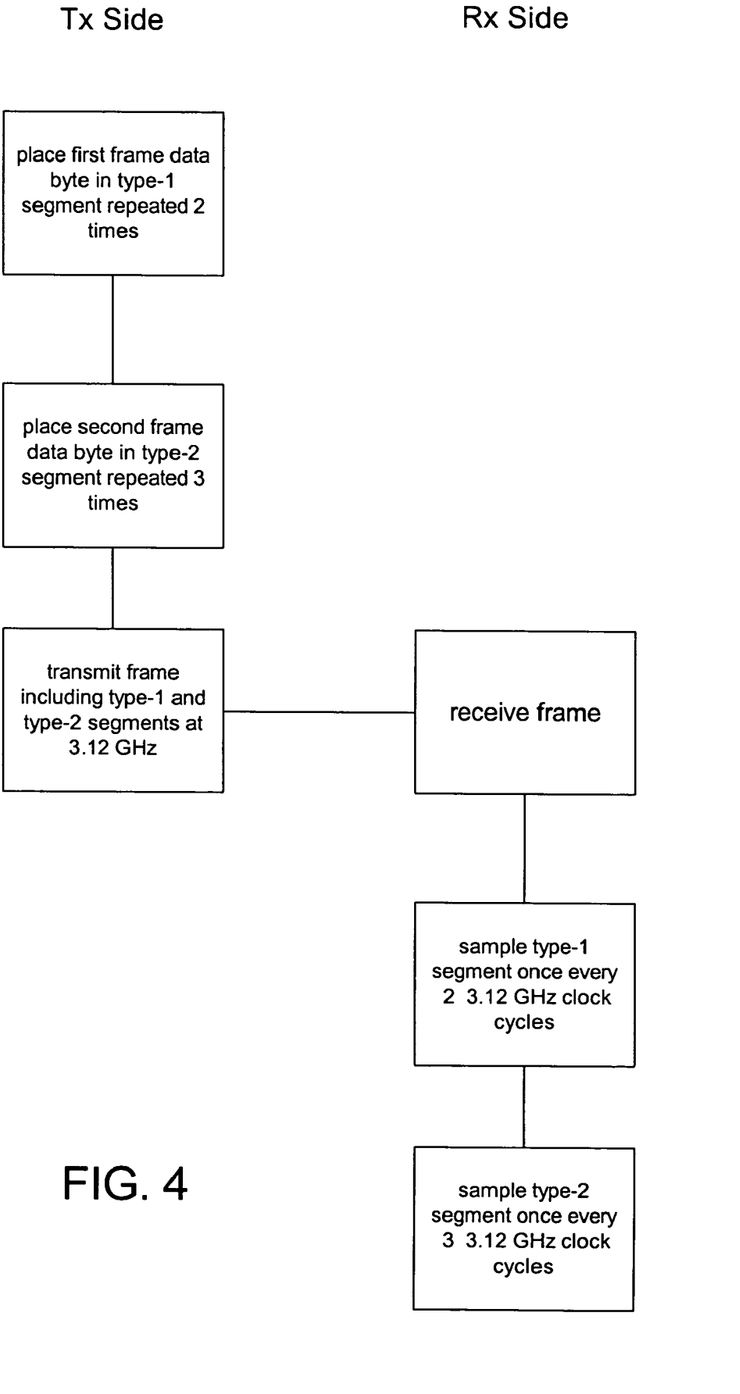
FIG. 4 is a flow chart depicting the operation of an embodiment of the invention.
Figure 5:
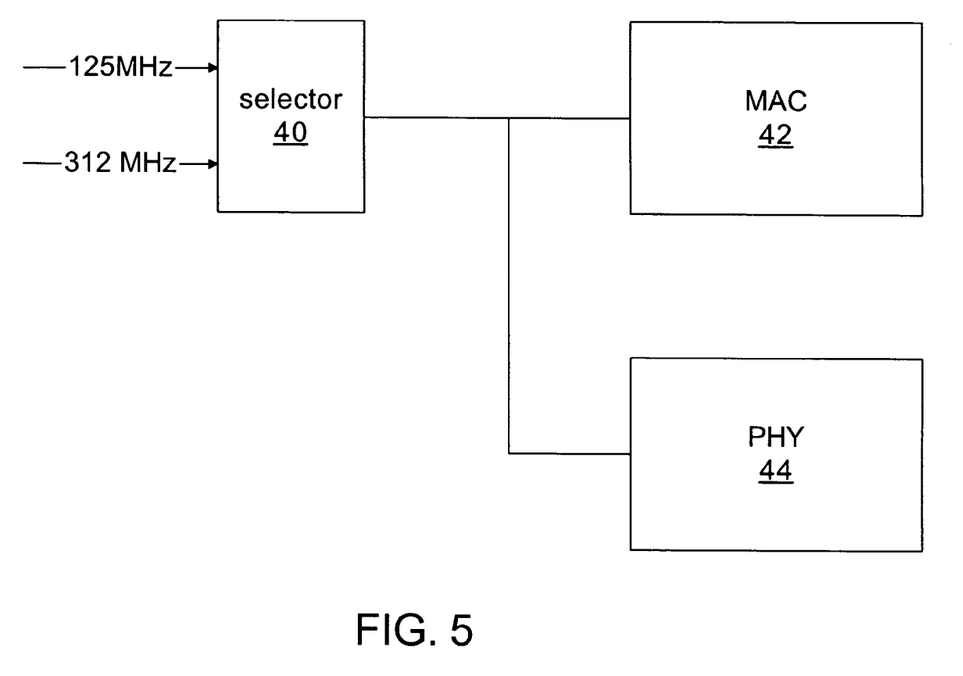
FIG. 5 is a block diagram of another embodiment of the invention.

Turning first to the 1000 Mbps port and the flow chart of FIG. 4, a type-1 segment having each data frame repeated 2 times is followed by a type-2 data segment having each data frame repeated 3 times to form a rate adapted data stream. Thus, in five frames clocked at a 2500 Mbps data transfer rate only two distinct data frames have been transmitted to reduce the actual data transfer rate to an adapted data transfer rate of 1000 Mbps. (The above does not include the constant factor increasing the actual clock rate due to encoding overhead which doesn't affect the ratios).

Figure 3:
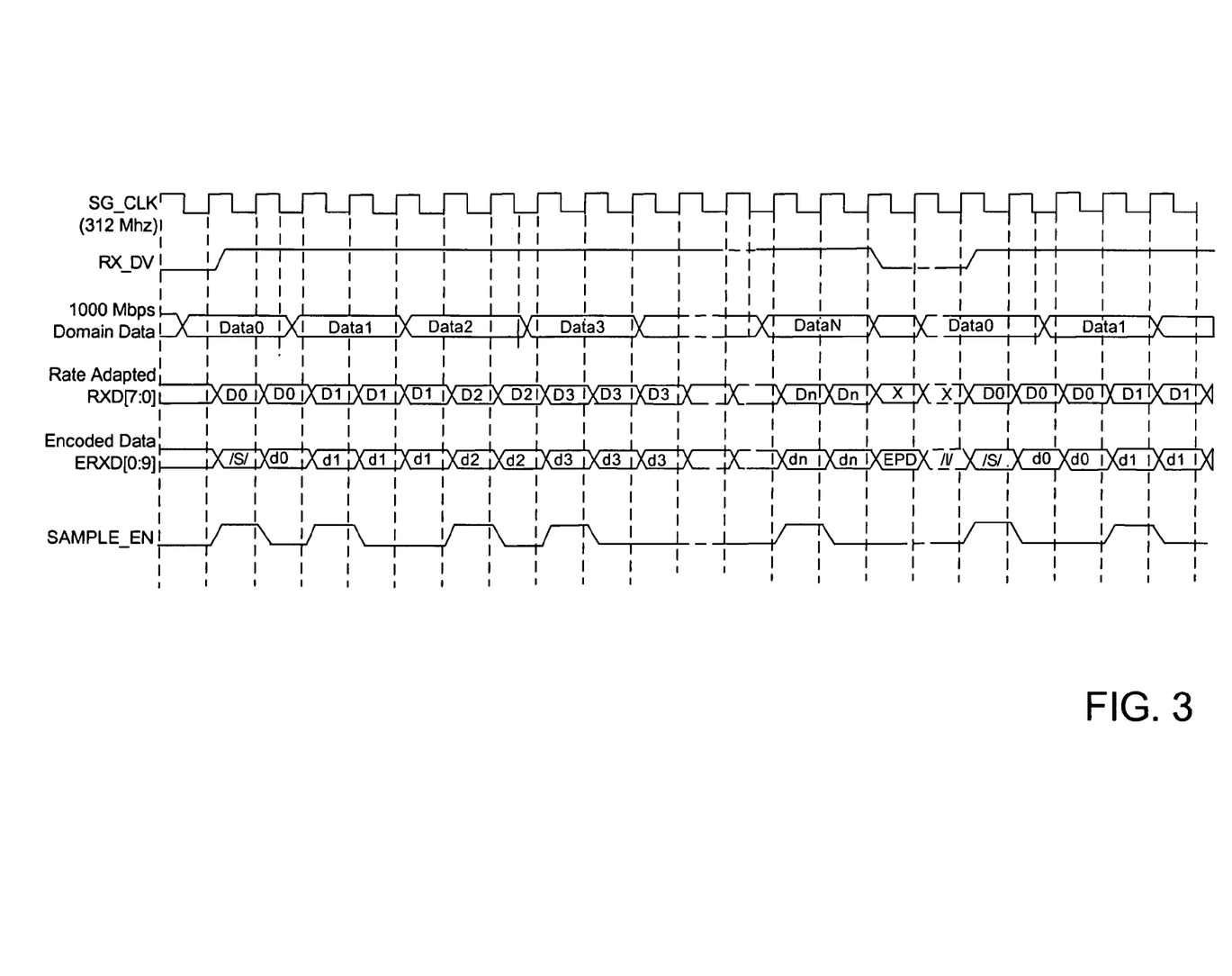
FIG. 3 is a timing diagram illustrating the operation of an embodiment of the invention.

As depicted in FIG. 3, a sample enable signal (SAMPLE. EN) is asserted only twice each five 2500 Mbps clock cycles, once every 2 cycles for a type-1 segment and once every three cycles for a type-2 segment, to sample the distinct data segments transmitted in the type-1 and type-2 data segments. Thus, the effective data transfer rate has been reduced by a factor of 2.5. The timing of the SAMPLE_EN signal caused the EXRD data in the 2500 Mbps domain to be sampled into the time slots of the 1000 Mbps domain.

The technique for reducing the data rate by a factor of 25 or 250 is analogous with the number of data frame repetitions increase by a factor of 10 or 100 respectively.

As described above, the SGMII Rate Adaptation logic which performs rate adaptation between 2500 and 1000 Mbps interfaces is transparent to the 802.3 MAC and 802.3z PCS layers designed for 10/100/1000 Mbps Ethernet.

The frame data is transferred between the 802.3 MAC and 802.3 PHY using the above mentioned frame stretching scheme. The following is a description of how the receive side of GMII signals get transferred from PHY chip and recovered at the MAC by using 8b/10b encoding operates in this embodiment. The same mechanism apply to the transmit side.

The PHY Rx rate Adapter (or adaptation logic) receives the rx data and control signals over GMII interface from the multi-rate (10/100/1000/2500 Mbps) PHY. The multi-rate PHY clocks this GMII interface at 2.5/25/125/312 Mhz, depending upon the speed of the port. The PHY Rx Rate Adaptation logic of FIG. 1 performs the above mentioned byte repeating and sends the data over GMII interface that works at 312.5 Mhz to PHY Tx PCS. Based on the assertion and de-assertion of RX_DV, the PHY chip PCS performs the framing delimiter, SPD (Start_of_Packet) and EPD (End_of_Packet) to frame data. The PHY chip PCS encodes error code /VI (Error_Propagation) ordered_set to indicate a data transmission error. The PHY chip serializes the PHY Tx PCS encoded 10 bit data and sends the bit stream over differential pair RX+/−.

MAC de-serializer recovers data and clock from the serial bit and sends data to MAC Rx PCS. The MAC Rx PCS detects framing delimiters and re-generates RX_DV signal based on SPD and EPD, and generates 8 bit decoded data. The MAC PCS generates RX_ER based on the /V/ error ordered_set received. Based upon the Speed Info, the MAC Rx Rate Adapter logic samples the data. FIG. 3 shows data sampling in 1000 Mbps mode. SAMPLE_EN is an internal signal to enable sampling of data at the first segment once every time for Type-0 segment (2.5 Gbps), once every 2, 20, 200 times for 1000, 100, 10 Mbps for Type-1 segment and once every 3, 30, 300 times for 1000, 100, 10 Mbps for Type-2 segment. As indicated earlier, the SPD (/S/) only appears once per frame. FIG. 3 shows the repeating data waveform for 1000 Mbps.

CRS is directly derived from RX_DV generated by MAC Rx PCS in the MAC chip and CRS signal bypasses the MAC Rx Rate Adapter module (or logic). Similarly, collision detect is derived by logical "AND" of TX_EN generated by MAC Tx Rate Adapter and RX_DV generated by MAC Rx PCS. COL also bypasses the MAC Rx Rate Adapter and goes to RX MAC like CRS.

A second embodiment of the invention will now be describe with reference to FIG. 4. In this embodiment two separate clock signals are supplied to the MAC and the PHY depending whether the nominal data transfer rate is 2500 Mbps or 10/100/1000 Mbps. As described above, the standard components for 1 GE will operate at 2.5 Gbps and the standard SGMII interface is designed to extend frames so that it is compatible with 10 or 100 as well 1000 Mbps Ethernet. Accordingly, a first clock signal at 125 MHz is provided to operate at 10/100/1000 Mbps Ethernet. A second clock signal at 312.5 MHz is provided to operate at 2.5 GE.

FIG. 4 is a block diagram of this embodiment. First and second clock inputs are coupled to a selector block 40 having an output coupled to the clock inputs of a MAC block 42 and a PHY block 44. As described above for 10/100/1000 Mbps Ethernet the first clock signal at 125 MHz is selected and for 2.5 GE the second clock signal at 312.5 MHz is selected.

The invention has now been described with reference to the preferred embodiments. Alternatives and substitutions will now be apparent to persons of skill in the art. Accordingly, it is not intended to limit the invention except as provided by the appended claims.

What is claimed is:

1. A system for implementing 2.5 Gbps Ethernet on a 10/100/1000 Ethernet legacy infrastructure, with the system comprising:

a physical layer (PHY) chip including:
a multi-rate (PHY) module for transferring and receiving data to and from a data transfer medium at a data transfer rate of either 2500/1000/100/10 Mbps, with the PHY module including a Tx PHY portion having a GMII (Gigabit Media Independent Interface) configured to receive frame data bytes at a clock rate of either 2.5, 25, 125, or 312.5 MHz and with the PHY module having an Rx PHY portion having a GMII configured to send frame data bytes at a clock rate of either 2.5, 25, 125, or 312.5 MHz;
an 802.3z physical coding sublayer (PCS) module including an 802.3z PCS Rx state machine configured to receive encoded data bytes at a clock rate of 312.5 MHz and configured to send data bytes at a clock rate of 312.5 MHz and with the 802.3z PCS module further including an 803.2z PCS Tx state machine configured to receive data bytes at a clock rate of 312.5 MHz and configured to transmit encoded data bytes having a clock rate of 312.5 MHz; and
a rate adaptation unit, coupling the PHY module and the 802.3z PCS module, configured to compensate for the difference between the 312.5 MHz clock rate of the 802.3z PCS module and the 2.5, 25, 125 data transfer rates of the PHY module, with the rate adaptation module having a PHY Rx rate adapter, coupling the Rx PH portion and the 802.3z PCS Tx state machine, configured to form elongated frames having each having first and second segments, with the first segment repeating a first frame byte a multiple of 2 time and the second segment repeating second frame byte a multiple of 3, times when transferring data between the Rx PH portion and 802.3z PCS Tx state machine and with the rate adaptation unit having a PHY Tx rate adapter, coupling the 802.3z PCS Rx state machine and the Tx PHY portion, configured to sample each segment of a received elongated frame only once when transferring data between the 802.3z PCS Rx state machine and the Tx PHY portion.

2. A system for implementing 2.5 Gbps Ethernet on a 10/100/1000 Ethernet legacy infrastructure, with the system comprising:

a media access layer (MAC) chip including:
an 802.3 MAC module for transferring and receiving data at a data transfer rate of either 2500/1000/100/10 Mbps, with the 802.3 MAC module including a Tx MAC portion having a GMII (Gigabit Media Independent Interface) configured to transmit frame data bytes at a clock rate of either 2.5, 25, 125, or 312.5 MHz and with the MAC module having an Rx MAC portion having a GMII configured to receive frame data bytes at a clock rate of either 2.5, 25, 125, or 312.5 MHz;
an 802.3z physical coding sublayer (PCS) module including an 802.3z PCS Rx state machine configured to receive encoded data bytes at a clock rate of 312.5 MHz and configured to send data bytes at a clock rate of 312.5 MHz and with the 802.3z PCS module further including an 803.2z PCS Tx state machine configured to receive data bytes at a clock rate of 312.5 MHz and configured to transmit encoded data bytes having a clock rate of 312.5 MHz; and a rate adaptation unit, coupling the MAC module and the 802.3z PCS module, configured to compensate for the difference between the 312.5 MHz clock rate of the 802.3z PCS module and the 2.5, 25, 125 data transfer rates of the MAC module, with the rate adaptation module having a MAC Tx rate adapter, coupling the Tx MAC portion to the 802.3z PCS Tx state machine, configured to form elongated frames having each having first and second segments, with the first segment repeating a first frame byte a multiple of 2 time and the second segment repeating second frame byte a multiple of 3 times, when transferring data between Tx MAC portion and the 802.3z PCS Tx state machine, and with the rate adaptation unit having a MAC Rx rate adapter, coupling the 802.3z PCS Rx state machine and the Rx MAC portion, configured to sample each segment of a received elongated frame only once when transferring data between 802.3z PCS Rx state machine and the MAC Rx portion.

3. A system for implementing 2.5 Gbps Ethernet on a 10/100/1000 Ethernet legacy infrastructure, with the system comprising:

a physical layer (PHY) chip including:

a multi-rate (PHY) module for transferring and receiving data to and from a data transfer medium at a data transfer rate of either 2500/1000/100/10 Mbps, with the PHY module including a Tx PHY portion having a GMII (Gigabit Media Independent Interface) configured to receive frame data bytes at a clock rate of either 2.5, 25, 125, or 312.5 MHz and with the PHY module having an Rx PHY portion having a GMII configured to send frame data bytes at a clock rate of either 2.5, 25, 125, or 312.5 MHz;

an 802.3z physical coding sublayer (PCS) module including an 802.3z PCS Rx state machine configured to receive encoded data bytes at a clock rate of 312.5 MHz and configured to send data bytes at a clock rate of 312.5 MHz and with the 802.3z PCS module further including an 803.2z PCS Tx state machine configured to receive data bytes at a clock rate of 312.5 MHz and configured to transmit encoded data bytes having a clock rate of 312.5 MHz; and a rate adaptation unit, coupling the PHY module and the 802.3z PCS module, configured to compensate for the difference between the 312.5 MHz clock rate of the 802.3z PCS module and the 2.5, 25, 125 data transfer rates of the PHY module, with the rate adaptation module having a PHY Rx rate adapter, coupling the Rx PHY portion and the 802.3z PCS Tx state machine, configured to form elongated frames having each having first and second segments, with the first segment repeating a first frame byte a multiple of 2 time and the second segment repeating second frame byte a multiple of 3, times when transferring data between the Rx PHY portion and 802.3z PCS Tx state machine and with the rate adaptation unit having a PHY Tx rate adapter, coupling the 802.3z PCS Rx state machine and the Tx PHY portion, configured to sample each segment of a received elongated frame only once when transferring data between the 802.3z PCS Rx state machine and the Tx PHY portion;

a media access layer (MAC) chip including:

an 802.3 MAC module for transferring and receiving data at a data transfer rate of either 2500/1000/100/10 Mbps, with the 802.3 MAC module including a Tx MAC portion having a GMII configured to transmit frame data bytes at a clock rate of either 2.5, 25, 125, or 312.5 MHz and with the MAC module having an Rx MAC portion having a GMII configured to receive frame data bytes at a clock rate of either 2.5, 25, 125, or 312.5 MHz;

an 802.3z physical coding sublayer (PCS) module including an 802.3z PCS Rx state machine configured to receive encoded data bytes at a clock rate of 312.5 MHz and configured to send data bytes at a clock rate of 312.5 MHz and with the 802.3z PCS module further including an 803.2z PCS Tx state machine configured to receive data bytes at a clock rate of 312.5 MHz and configured to transmit encoded data bytes having a clock rate of 312.5 MHz; and a rate adaptation unit, coupling the MAC module and the 802.3z PCS module, configured to compensate for the difference between the 312.5 MHz clock rate of the 802.3z PCS module and the 2.5, 25, 125 data transfer rates of the MAC module, with the rate adaptation module having a MAC Tx rate adapter, coupling the Tx MAC portion to the 802.3z PCS Tx state machine, configured to form elongated frames having each having first and second segments, with the first segment repeating a first frame byte a multiple of 2 time and the second segment repeating second frame byte a multiple of 3 times, when transferring data between Tx MAC portion and the 802.3z PCS Tx state machine, and with the rate adaptation unit having a MAC Rx rate adapter, coupling the 802.3z PCS Rx state machine and the Rx MAC portion, configured to sample each segment of a received elongated frame only once when transferring data between 802.3z PCS Rx state machine and the MAC Rx portion.

4. A system for implementing 2.5 Gbps Ethernet on a 10/100/1000 Ethernet legacy infrastructure, with the system comprising:

a multi-rate physical layer (PHY) module, having a clock input, for transferring data to a data transfer medium at a data transfer rate of either 2500/1000/100/10 Mbps;

a multi-rate media access control (MAC) module, having a clock input;

an SGMII(Serial Gigabit Media Independent Interface) coupling the PHY module and the MAC module; and a selector, having a clock output connected to the clock inputs of the PHY module and the MAC module, for supplying a 312.5 MHz clock signal when the PHY module is transferring data to the data transfer medium at 2500 Mbps and for supplying a 125 MHz clock signal when the PHY module is transferring data at 1000, 100, or 10.

5. A method for transmitting frame data bytes at a high fixed clock rate of 312.5 MHz when frame data bytes are received at different slower data transfer rates to implement 2500/1000/100/10 Mbps Ethernet, said method performed at a receive rate adaptation block coupling a receive GMII (Gigabit Media Independent Interface) to a transmit GMII comprising the steps of:

transmitting data bytes on the transmit GMII at a data transfer rate of 2500 Mbps;

transmitting a 2500 Mbps frame repeating each frame data byte once per frame if the frame data bytes are received at a data transfer of 2500 Mbps;

transmitting a 1000 Mbps frame having two segments, a first segment repeating a first frame data byte 2 times and a second segment repeating a second frame byte 3 times if the frame data bytes are received at a data transfer rate of 1000 Mbps;

transmitting a 100 Mbps frame having two segments, a first segment repeating a first frame data byte 20 times and a second segment repeating a second frame byte 30 times if the frame data bytes are received at a data transfer rate of 100 Mbps; and transmitting a 10 Mbps frame having two segments, a first segment repeating a first frame data byte 200 times and a second segment repeating a second frame byte 300 times if the frame data bytes are received at a data transfer rate of 10 Mbps.

6. A method for transmitting frame data bytes at different slow data rates and receiving the frame data bytes at a high fixed clock rate of 312.5 MHz to implement 2500/1000/100/10 Mbps Ethernet, said method performed at a transmit rate adaptation block coupling a receive GMII(Gigabit Media Independent Interface) to transmit GMII comprising the steps of:

receiving frame data bytes on the receive GMII at a data transfer rate of 500 Mbps;

sampling each frame data byte of a 2500 Mbps frame repeating each frame data byte once per frame to transmit the received frame data bytes at a data transfer of 2500 Mbps;

sampling each segment of a 1000 Mbps frame only once, with a 1000 Mbps frame having two segments, a first segment repeating a first frame data byte 2 times and a second segment repeating a second frame byte 3 times to transmit the received data frame bytes at a data transfer rate of 1000 Mbps;

sampling each segment of a 1000 Mbps frame only once, with a 1000 Mbps frame having two segments, a first segment repeating a first frame data byte 20 times and a second segment repeating a second frame byte 30 times to transmit the received data frame bytes at a data transfer rate of 100 Mbps; and sampling each segment of a 10 Mbps frame only once, with a 10 Mbps frame having two segments, a first segment repeating a first frame data byte 200 times and a second segment repeating a second frame byte 300 times to transmit the received data frame bytes at a data transfer rate of 10 Mbps.

7. A system for transmitting frame data bytes at a high fixed clock rate of 312.5 MHz when frame data bytes are received at different slower data transfer rates to implement 2500/1000/100/10 Mbps Ethernet, said method performed at a receive rate adaptation block coupling a receive GMII (Gigabit Media Independent Interface) to a transmit GMII comprising:

means for transmitting data bytes on the transmit GMII at a data transfer rate of 2500 Mbps;

means for transmitting a 2500 Mbps frame repeating each frame data byte once per frame if the frame data bytes are received at a data transfer of 2500 Mbps;

means for transmitting a 1000 Mbps frame having two segments, a first segment repeating a first frame data byte 2 times and a second segment repeating a second frame byte 3 times if the frame data bytes are received at a data transfer rate of 1000 Mbps;

means for transmitting a 100 Mbps frame having two segments, a first segment repeating a first frame data byte 20 times and a second segment repeating a second frame byte 30 times if the frame data bytes are received at a data transfer rate of 100 Mbps; and means for transmitting a 10 Mbps frame having two segments, a first segment repeating a first frame data byte 200 times and a second segment repeating a second frame byte 300 times if the frame data bytes are received at a data transfer rate of 10 Mbps.

8. A system for transmitting frame data bytes at different slow data rates and receiving the frame data bytes at a high fixed clock rate of 312.5 MHz to implement 2500/1000/100/10 Mbps Ethernet, said method performed at a transmit rate adaptation block coupling a receive GMII(Gigabit Media Independent Interface) to transmit GMII comprising:

means for receiving frame data bytes on the receive GMII at a data transfer rate of 500 Mbps;

means for sampling each frame data byte of a 2500 Mbps frame repeating each frame data byte once per frame to transmit the received frame data bytes at a data transfer of 2500 Mbps;

means for sampling each segment of a 1000 Mbps frame only once, with a 1000 Mbps frame having two segments, a first segment repeating a first frame data byte 2 times and a second segment repeating a second frame byte 3 times to transmit the received data frame bytes at a data transfer rate of 1000 Mbps;

means for sampling each segment of a 100 Mbps frame only once, with a 100 Mbps frame having two segments, a first segment repeating a first frame data byte 20 times and a second segment repeating a second frame byte 30 times to transmit the received data frame bytes at a data transfer rate of 100 Mbps; and means for sampling each segment of a 100 Mbps frame only once, with a 100 Mbps frame having two segments, a first segment repeating a first frame data byte 200 times and a second segment repeating a second frame byte 300 times to transmit the received data frame bytes at a data transfer rate of 10 Mbps.

* * * * *